(12) United States Patent
Yamada et al.

(10) Patent No.: US 7,783,389 B2
(45) Date of Patent: Aug. 24, 2010

(54) POWER STORAGE EQUIPMENT MANAGEMENT SYSTEM

(75) Inventors: Kazuo Yamada, Nara (JP); Takashi Fukushima, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 274 days.

(21) Appl. No.: 11/290,465

(22) Filed: Dec. 1, 2005

(65) Prior Publication Data

US 2006/0122738 A1 Jun. 8, 2006

(30) Foreign Application Priority Data

Dec. 3, 2004 (JP) .............................. 2004-351325

(51) Int. Cl.
G05D 3/12 (2006.01)
H02J 3/00 (2006.01)
(52) U.S. Cl. ......................... 700/286; 700/297; 307/31
(58) Field of Classification Search ................. 700/286, 700/295, 297; 307/18, 31, 80
See application file for complete search history.

(56) References Cited

U.S. PATENT DOCUMENTS

| | | | | |
|---|---|---|---|---|
| 5,958,054 | A * | 9/1999 | O'Connor et al. | 713/300 |
| 6,465,908 | B1 * | 10/2002 | Karuppana et al. | 307/31 |
| 6,487,509 | B1 * | 11/2002 | Aisa | 702/62 |
| 6,925,361 | B1 * | 8/2005 | Sinnock | 700/286 |
| 7,130,832 | B2 * | 10/2006 | Bannai et al. | 705/412 |
| 7,291,412 | B2 * | 11/2007 | Kazama et al. | 429/23 |
| 2002/0087234 | A1 * | 7/2002 | Lof et al. | 700/286 |
| 2003/0009265 | A1 * | 1/2003 | Edwin | 700/295 |
| 2003/0036820 | A1 * | 2/2003 | Yellepeddy et al. | 700/291 |
| 2004/0167676 | A1 * | 8/2004 | Mizumaki | 700/286 |
| 2004/0230343 | A1 * | 11/2004 | Zalesski | 700/297 |
| 2006/0259199 | A1 * | 11/2006 | Gjerde et al. | 700/284 |
| 2006/0276938 | A1 * | 12/2006 | Miller | 700/295 |

FOREIGN PATENT DOCUMENTS

| | | |
|---|---|---|
| JP | 2001-306755 | 11/2001 |
| JP | 2001-306839 | 11/2001 |
| JP | 2002-101554 | 4/2002 |
| JP | 2002-215751 | 8/2002 |
| JP | 2002-233053 | 8/2002 |
| JP | 2002-262456 | 9/2002 |
| JP | 2003-158825 | 5/2003 |
| JP | 2003-248717 | 9/2003 |
| JP | 2003-333754 | 11/2003 |
| JP | 2004-326375 | 11/2004 |

OTHER PUBLICATIONS

Japanese version of PCT/JP2005/007703.

* cited by examiner

Primary Examiner—Paul L Rodriguez
Assistant Examiner—Sheela Rao
(74) Attorney, Agent, or Firm—Nixon & Vanderhye P.C.

(57) ABSTRACT

A power storage equipment management system has a power storage equipment, and a management server for managing power information of the power storage equipment. The power storage equipment includes a power receiving unit for obtaining power for charging, a power supplying unit for supplying charged power to a load, an information controller for generating power information by charging and discharging of the power receiving unit or the power supplying unit, and a communication unit for transmitting the power information to the management server. The management server includes an information management unit for determining a consideration with respect to the power information transmitted from the power storage equipment by using consideration information which has been set beforehand.

10 Claims, 6 Drawing Sheets

FIG.5

·PRODUCT SUPPORTING MEASURES TO REDUCE THE ENVIRONMENTAL LOAD-
WE SUPPORT POWER STORAGE EQUIPMENT CAPABLE OF EFFECTIVELY UTILIZING
MIDNIGHT POWER WHICH PLACES A SMALL ENVIRONMENTAL LOAD. THE
ELECTRIC ENERGY SHIFTED TO THE DAYTIME POWER BY THE POWER STORAGE
EQUIPMENT THAT WE ARE SUPPORTING CURRENTLY CORRESPONDS TO 5% OF
THE ELECTRIC ENERGY REQUIRED FOR THE BUSINESS OPERATION OF OUR
COMPANY. (THE RATIO OF THE SUPPORTING ELECTRIC ENERGY TO THE ELECTRIC
POWER CONSUMPTION OF OUR COMPANY IS CALCULATED FROM THE
PERFORMANCE IN THE FISCAL YEAR 2002.)

POWER STORAGE EQUIPMENT MANAGEMENT SYSTEM

CROSS-REFERENCE TO RELATED APPLICATION

This application is related to Japanese Patent Application No. 2004-351325 filed on Dec. 3, 2004, on the basis of which priority is claimed under 35 USC §119, the disclosure of this application being incorporated by reference in its entirety.

BACKGROUND OF THE INVENTION

1. Field of the Technology

The present technology relates to a management system for power storage equipment which stores power, or a management system for power storage equipment provided together with power generation equipment. In particular, the present technology relates to a system enabling to expand user's merits so as to promote introduction of power storage equipment by establishing such a system that a user who installs power storage equipment is provided with not only economical values obtained by storing power in the power storage equipment and consuming it, but also social status and values for the environmental contribution.

The present technology also relates to a power storage equipment management method, a power storage equipment management program, and a management server constituting the power storage equipment management system.

2. Description of Related Art

Demands for power are increasing. In homes, various electric appliances such as refrigerators, microwave ovens, cookers, washing machines and air conditioners, televisions, audio-visual equipment, personal computers, and game consoles are widely used. In offices such as companies and various organizations, business machines such as personal computers, copy machines, facsimiles and printers, and air-conditioners are provided. Further, in stores, lighting fixtures and exhibits are provided, and even in neighboring facilities and communities, various electronic apparatuses and electric apparatuses are installed. Therefore, the amount of power consumption is growing each year. Further, the load factor which is a ratio between the amount of power consumption at the peak time and the average amount of power consumption is getting worse each year. The worsening in the load factor requires power companies to maintain power generation equipment for coping with the peak power demand, which causes a problem that they cannot operate the power generation equipment efficiently. Further, as power generation equipment for coping with the load change, thermal power generation, in which activation and shutdown are performed easily, is mainly used. Therefore, it is not preferable for the environment since the discharge amount of $CO_2$ is large in comparison with the average of the whole powers. In view of these problems, various studies and efforts are under way in order to level the load.

Further, with a rise in environmental consciousness in recent years, it is promoted to introduce power generation equipment such as power generation systems using natural energy and fuel cells, causing less environmental load, in worldwide. Currently, introduction of such power generation equipment is promoted with supports, partially or as a whole, by support measures implemented with subsidies of respective countries for example. With a widespread of such power generation equipment, it is considered that power generation equipment provided together with power storage equipment will be widely used from now.

JP-A 2002-233053 discloses a system, having power storage equipment, in which power is purchased when the price is low and is sold when the price is high. The system disclosed in JP-A 2002-233053 includes: a purchase decision making device for determining the optimum purchase amount and purchase timing of power in accordance with predetermined purchase rules based on price fluctuation information of the power price; a power storage device for storing purchased power; a sell decision making device for determining the optimum selling amount and selling timing of the stored power in accordance with predetermined selling rules based on the price fluctuation information of the power price; and an electronic settlement device with which transfer of money in association with the purchase and selling of power is performed through electronic settlement.

JP-A 2001-306839 discloses a transaction method and a transaction system for a carbon dioxide emission right. In JP-A 2001-306839, when the actual discharge amount of carbon dioxide is greater than the carbon dioxide emission right that an entity has obtained, a center transmits an instruction to the entity to obtain the carbon dioxide emission right corresponding to the excess. On the other hand, when another entity carries out photovoltaic power generation, the center gives, to the entity, the carbon dioxide emission right corresponding to the amount of the power generation. Transaction between the both carbon dioxide emission rights are performed on the Internet, and the selling/purchase price of the carbon dioxide emission right may be determined by the center or by a floating rate system.

JP-A 2002-233053 discloses a system in which midnight power, the price of which is relatively low, is stored, and is sold in the daytime when the price is relatively high so as to gain benefit. However, it is not a system giving values by evaluating a value for the environmental contribution in addition to an economical value obtained by storing power in power storage equipment and consuming the power. Further, JP-A 2001-306839 discloses an invention relating to a transaction method for a carbon dioxide emission right, in which a carbon dioxide emission right by the photovoltaic power generation is traded. This is not a system including power storage equipment and providing values by evaluating environmental contribution.

In general, power storage equipment for storing power is not widely used currently due to the high installment cost and maintenance cost. Although there is a problem that the load factor worsens as described above, no system exists for grasping and evaluating situations about values of power usage patterns in which power storage equipment and power generation equipment affect the improvement of the load factor. Further, it is impossible to actually classify the types of power. Therefore, currently, only differences are made in power prices by power menus set depending on time zones such as a midnight power menu. In such a situation, an owner of power storage equipment only acquires economical benefit from the difference between the price of night time power and the price of daytime power, set by a power purchase menu. Consequently, the fact that sufficient economical benefit cannot be gained in many cases is considered as one reason of hampering widespread of power storage equipment.

Further, although power generation equipment placing small environmental load may be widespread further in the future, the power generation cost including the introduction cost has not reached the same level as the power generation cost of the electric power company performing power generation with large-scale power generation equipment. In fact, the difference in cost is currently covered by supports from the county or municipalities, a price menu of advantageous conditions provided by an electric power company, or a burden borne by a person who has high environmental consciousness.

In particular, there is no means to evaluate environmental contribution by a user, having small-scale power storage equipment such as one for a household use, who stores midnight power and uses it in the daytime so as to level the load whereby carbon dioxide generated when generating power can be reduced, or to evaluate environmental contribution by self-consuming power generated by small-scale power generation equipment so as to contribute to the load leveling of a large-scale power generation plant. Further, since the contribution is small in the absolute amount when taken individually, there is no system for collecting them on which a third party who wants to obtain the values depends. Therefore, it is impossible to distribute the values. For example, it is impossible to make a transaction (selling) of the values like carbon dioxide emission right.

On the other hand, a user has a demand to collect the investment required for installment as early as possible, in addition to environmental contribution. Accordingly, in order to expand use, in a full scale, of a power storage system for reserving power, and further a power storage system combined with a power generation system causing small environmental load, such a demand of a user must be met.

BRIEF SUMMARY

The present technology has been developed while taking into consideration the aforementioned problems. Therefore, the present technology provides a system enabling to appropriately evaluate social status and values for environmental contribution by installing small-scale power storage equipment and power storage equipment provided together with power generation equipment, and to promote introduction of such equipment. The present technology also provides a power storage equipment management method and a power storage equipment management program.

In order to solve the aforementioned problems, the present technology provides a power storage equipment management system having: a power storage equipment and a management server for managing power information of the power storage equipment, wherein the power storage equipment includes a power receiving unit for obtaining power for charging and power information, a power supplying unit for supplying charged power to a load, an information controller for generating power information by charging and discharging of the power receiving unit or the power supplying unit, and a communication unit for transmitting the power information to the management server, and the management server includes, an information management unit for determining a consideration with respect to the power information transmitted from the power storage equipment by using consideration information which has been set beforehand.

BRIEF DESCRIPTION OF THE DRAWINGS

FIG. 5 is an explanatory diagram of an example of a label attached to a product in accordance with an example embodiment.

DESCRIPTION OF THE PREFERRED EMBODIMENTS

Figure 1:
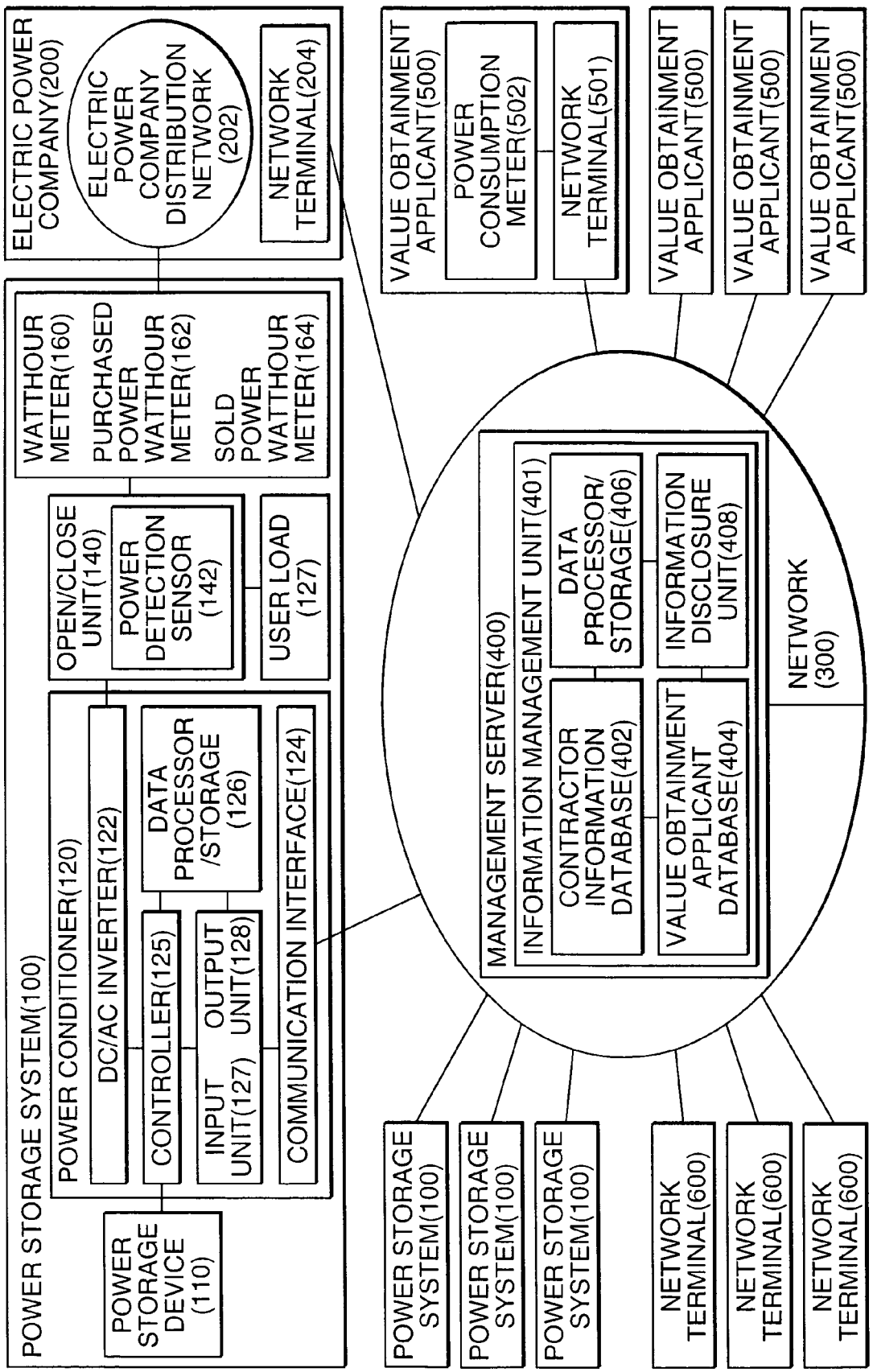
FIG. 1 is a block diagram showing an overall configuration of an example embodiment of a power storage management system.

The present technology also provides a power storage equipment management system having: a power generation equipment and power storage equipment, and a management server for managing power information of the power storage equipment, wherein the power storage equipment includes, a power receiving unit which is charged with power from the power generation equipment or power from a power system, and power information; a power supplying unit for supplying charged power to a load, an information controller for generating power information by charging and discharging of the power receiving unit or the power supplying unit, and a communication unit for transmitting the power information to the management server, and the management server includes, an information management unit for determining a consideration of the power information transmitted from the power storage equipment by using consideration information which has been set beforehand.

In the power storage equipment management system according to the present technology, preferably, the power generation equipment is a power generation equipment utilizing natural energy or a fuel cell, or a power generation equipment using a gas engine generator.

In the power storage equipment management system according to the present technology, preferably, received power information of the power receiving unit includes information of either a type of power or a receiving time.

In the power storage equipment management system according to the present technology, preferably, supplying power information of the power supplying unit includes information of either a time at which power is supplied from the power storage equipment to the load or a consumption class.

In the power storage equipment management system according to the present technology, preferably, the consideration is set corresponding to at least one of a difference in environmental load between received power information of the power receiving unit and supplying power information of the power supplying unit, and an improvement of load factor with respect to the system.

The present technology also provides a power storage equipment management system having a power storage equipment and a management server for managing power information of the power storage equipment, wherein the power storage equipment includes a power receiving unit for obtaining power for charging; a power supplying unit for supplying charged power to a load; an information controller for generating power information by charging and discharging of the power receiving unit or the power supplying unit; and a communication unit for transmitting the power information to the management server, and the management server includes: a contractor information storage for storing, by each contractor, power information of the contractor transmitted from the power storage equipment; a value obtainment applicant information storage for storing consideration information in which power setting information having been set by a value obtainment applicant and a consideration are associated; and an information management unit for determining a consideration of the power information transmitted from the power storage equipment by using the consideration information.

In the power storage equipment management system according to the present technology, preferably, the management server includes a disclosure information storage for storing disclosure information including the consideration information, and in the case where there are plural pieces of consideration information stored on the value obtainment applicant information storage, the information management unit selects all pieces of consideration information associated with the power information received from the power storage equipment, and causes the disclosure information including all pieces of the consideration information selected to be viewable, and in the case of receiving information that a contractor of the power storage equipment selected a specific piece of consideration information among all pieces of the viewable consideration information selected, determines a consideration included in the consideration information selected as a consideration of the contractor.

The present technology also provides a management server of a power storage equipment management system, including a communication unit for receiving power information relating to charging or discharging from power storage equipment which charges or discharges power, a contractor information storage for storing the power information received for each contractor who owns the power storage equipment, a value obtainment applicant information storage for storing, in advance, consideration information, in which the power information is associated with a consideration, for each value obtainment applicant providing the consideration, and an information management unit for determining a consideration corresponding to the power information received by using the consideration information, wherein the communication unit informs the contractor and the value obtainment applicant who has set the consideration of the consideration being determined.

The present technology also provides a power storage equipment management method including the steps of, i) receiving power for charging a power storage equipment, ii) supplying the power charged in the power storage equipment to a load, iii) generating a power information relating to charged power or discharged power obtained in the power receiving step or in the power supplying step, iv) transmitting the power information to a management server, and v) determining, by the management server, a consideration with respect to the power information transmitted from the power storage equipment by using the consideration information which has been set beforehand.

The present technology also provides a power storage equipment management program for allowing a computer to execute the steps of, i) receiving a power for charging a power storage equipment, ii) supplying the power charged in the power storage equipment to a load, iii) generating a power information relating to charged power or discharged power obtained in the power receiving step or in the power supplying step, iv) transmitting the power information to a management server, and v) determining, by the management server, a consideration with respect to the power information transmitted from the power storage equipment by using the consideration information which has been set beforehand.

According to the present technology, the power storage equipment management system has a power storage equipment and a management server for managing power information of the power storage equipment. The power storage equipment includes a power receiving unit for obtaining power for charging, a power supplying unit for supplying charged power to a load, an information controller for generating power information by charging and discharging of the power receiving unit or the power supplying unit, and a communication unit for transmitting the power information to the management server. The management server includes an information management unit for determining a consideration with respect to the power information transmitted from the power storage equipment by using consideration information which has been set beforehand. Therefore, it is possible to determine a consideration with respect to a value for environmental contribution of the power storage equipment, which has not been defined clearly. Further, the present technology enables to recognize such a value, and to provide preferable benefits to both of a company (value obtainment applicant) giving the consideration and the owner of the power storage equipment, to thereby promote introduction of power storage equipment.

Further, the power storage equipment management system of the present technology has a power generation equipment placing small environmental load, power storage equipment, and a management server for managing power information of the power storage equipment. The power storage equipment includes a power receiving unit which is charged with power from the power generation equipment or power from a power system, a power supplying unit for supplying charged power to a load, an information controller for generating power information by charging and discharging of the power receiving unit or the power supplying unit, and a communication unit for transmitting the power information to the management server. The management server includes an information management unit for determining a consideration of the power information transmitted from the power storage equipment by using consideration information which has been set beforehand. As a result, a management system for power storage equipment provided together with power generation equipment is configured. Therefore, by installing the power storage equipment provided together with the power generation equipment, it is possible to determine a consideration with respect to a value for environmental contribution of the power storage equipment and power generation equipment, which has not been defined clearly. Further, the present technology enables to recognize such a value, and to provide preferable benefits to both of a company (value obtainment applicant) giving the consideration and the owner of the power storage equipment, to thereby promote introduction of power storage equipment and distributed power generation equipment.

In the power storage equipment management system according to the present technology, the power generation equipment is a power generation equipment utilizing natural energy or a fuel cell, or power generation equipment using a gas engine generator. Therefore, by installing the power generation equipment together with the power storage equipment, it is possible to contribute to environment and to make the power generation equipment widespread.

In the power storage equipment management system according to the present technology, received power information of the power receiving unit includes information of either a type of power or a receiving time. Therefore, it is possible to make the power generation equipment placing small environmental load widespread and to level the load.

In the power storage equipment management system according to the present technology, supplying power information of the power supplying unit includes information of either a time at which power is supplied from the power storage equipment to the load or a consumption class. Therefore, it is possible to promote power consumption which places small environment load.

In the power storage equipment management system according to the present technology, the consideration is set corresponding to at least one of a difference in environmental load between received power information of the power receiving unit and supplying power information of the power supplying unit, and a improvement of load factor with respect to a system. Therefore, it is possible to promote a use mode of power which places small environment load and, also, to promote improvement in load factor.

As used herein, the term "power generation equipment" refers to an equipment including a power storage device such as a secondary battery like a lead acid battery, a Metal Hydride Battery, a Lithium-ion Battery, or an electrical double layer capacitor, and a configuration of charging or discharging the power storage device so as to generate power information. Alternatively, it may be a power storage equipment in which water is electrolyzed by electricity and hydrogen is stored, and the hydrogen is supplied to a fuel cell as required, whereby power is extracted. Further, the term "power generation equipment placing small environmental load" typically refers to a photovoltaic power generation device, a wind power generation device, a micro water power generation device, a fuel cell, and power generation by a gas engine.

These power storage equipment and power generation equipment are installed in each house, apartment and building, or are installed in a traffic signal, a public facility, a street lamp of a public street, and the like. The power storage equipment and power generation equipment have no limitation in the equipment scale, and in a case of large-scale equipment, it can perform transaction solely. The present technology is not only applied to a large-scale equipment. In a case of a small system which is difficult to perform transaction solely, or in a case where large-scale equipment and small-scale equipment are combined, the present technology enables transaction by collecting them.

A small system refers to an equipment which is used in, for example, home, a small-scale company or an organization. In the case of the power storage equipment, the scale is preferably not more than 100 kWh, and more preferably, not more than 50 kWh but not less than 0.5 kWh. In the case of the power generation equipment, the scale is not more than 20 kWh, and more preferably, not more than 10 kW but not less than 0.5 kW. In a state where a plurality of the power storage equipment or the power generation equipment are connected over a network in a scale of several thousands or more numbers, the present technology can be effectively used in particular. Alternatively, the present technology can make a small-scale transaction effective such as an auction on the Internet.

As used by way of example herein, a management server is a computer installed in a company or a vendor who collects power information of the power storage equipment and the power generation equipment, and mediates between a provider of the power information and a value obtainment applicant. In an example embodiment, a power storage system having the power storage equipment and the power generation equipment, and the value obtainment applicant and the management server are connected over a network such as the Internet or a dedicated line. In an example embodiment, a contribution is determined based on power information in the management server, for example. Factors in determining the contribution include time of storing power in the power storage equipment, and types of power used for power storage. The types of power includes power generation patterns such as information for classifying types like water power generation, thermal power generation and nuclear power generation, locational conditions of power generation equipment, distance to the power generation plant, and information classifying time zones of power generation.

For example, relating to power storage, in a case of storing midnight power and using the stored power in a time zone of daytime in which the power demand is large (in a time zone having large power demand, power from the system is not used), values for the environmental contribution and improvement of the load factor to the power system are generated, and a consideration with respect to the values is determined. As another case example, power generated in the morning hours with a solar cells is stored until a time zone of daytime in which the power demand is large, and when the power is used in the time zone of daytime, there are generated value that the power generated by the photovoltaic power generation and value contributing to the improvement of the load on the electric power system in the daytime. That is, by combining the power generation equipment and the power storage equipment, value of reducing the load is added to the value of power acquired by the photovoltaic power generation which has generated value conventionally. Thereby, it is possible to increase the value.

As used herein, the term "consideration" in the consideration information means a consideration (or value) which is obtained by a time shift where midnight power supplied from usually an outside power generation equipment is stored in the power storage system of the present technology so as to be able to consume the stored power in daytime, by a load leveling of the power generation equipment where it can operate in midnight when the load is less than daytime, and by power generated in the power generation equipment when the power storage system of the present technology to provides it. The consideration does not mean a value of power purchased from an outside power generation equipment (i.e, electric power company).

This is a value information with respect to power which is introduced for the first time in the present technology. For example, as for power which is time-shifted by a power storage system, there may be a value with respect to a contribution to the load leveling between daytime power and night time power, and a value with respect to environmental improvement such as reduction of carbon dioxide emission in the case of thermal power generation. The scale of the value can be specified corresponding to the level of the contribution by managing power information thereof. Therefore, the power information means data such as information about the level of environmental contribution, information about contribution to carbon dioxide reduction, and information about cost for power generation cost reduction, as data relating to the value. This is data used for converting (processing) power information transmitted from a power storage system of a contractor to information relating to a consideration.

Further, the considerations can be determined corresponding to consumption patterns (consumption classification information). By determining considerations with respect to values of environmental contribution as described above, it is possible to promote leveling of the load.

As for the term "consumption classification information" as used herein, even in a case where power is consumed with equipment inside the own building, if consumption by equipment required for the normal living (e.g., refrigerators) and consumption by an equipment (e.g. equipment for entertainment or games) which is unnecessary for the minimum living are conducted, such consumption may be distinguished. Further, in a case where they cannot be distinguished precisely, the amount of power consumption may be weighted in several stages, and a consideration may be set for each.

Further, considerations may differ depending on the contract content made between an owner (contractor) of the power storage equipment or the power generation equipment, and a provider of the management system, a value obtainment applicant or an electric power company. Therefore, a power contract information managed by the management server may include information about the contract contents. For example, for the power storage equipment provided together with the power generation equipment, information such as a power selling contract term, power selling time zones and maximum amount of power to be sold, in the power selling contract, may be included in power contract information. Further, in order to classify considerations depending on contract contents such as whether power is supplied to neighboring facilities, a method of setting value with respect to the power and a settlement method, and types of agencies, information of these contract contents may be included in the power contract information.

Information in which these values are quantized is the consideration information, which consists of considerations and conditions for obtaining the considerations. Considerations corresponding to the consideration information include not only moneys but also goods, cash vouchers and contribution points. The consideration information is given in a form showing conditions for contributions (also referred to as value obtainment conditions). For example, it is numerical data or symbol data in which such information that if a condition "A" is satisfied for power consumption, a product (consideration) "B" is given for free is quantified or coded. Specific examples will be explained in the embodiment described later. The goods may include articles of interest and tastes and rare goods such as garden chairs, organic vegetable sets, domestic air tickets, theater tickets, and premier tickets.

This value may be operated with a fixed price by setting an absolute standard, or may be a system in which the price is variably determined by the relationship of demand and supply between a contractor providing the value and a value obtainment applicant who desires to obtain the value.

Further, in a case where a certain consideration is determined with respect to power information, on the power storage equipment side and on the power generation equipment side, power information by charging and discharging, generated during a certain time period, may be transmitted to a management server with information for classifying them so as to be accumulated in the management server. Alternatively, the power information by charging and discharging may be accumulated on the power storage equipment side and on the power generation equipment side, and if for each time it exceeds a certain amount, the information may be transmitted to the management server. Further, as for the transmission method of data, it may be transmitted automatically, or may be in a form in which numerical value displayed on the display of the power storage equipment or the power generation equipment is read out, which is transmitted by a user using a terminal.

As used herein, a value obtainment applicant means an entity providing a consideration to a value generated by the power storage system, that is, a manufacturer of storage batteries, a manufacturer of solar cells, wind turbine generators, micro water power generators, fuel cells or gas engines, an environmental improvement promoting organization, a public organization, a corporation, a charitable organization, an electric power company, or an applicant for purchasing a carbon dioxide emission right (company), for example.

Disclosure information includes power information of a contractor, power value data, and obtainment consideration information of a value obtainment applicant, for example, which is disclosed to a user of the system according to the present technology over a network.

Disclosure information includes power information of a contractor, power value data, and obtainment consideration information of a value obtainment applicant, for example, which is disclosed to a user of the system according to the present invention over a network.

As for a transmission procedure (protocol) and a communication network used between the power generation equipment and the management servers, any one which is used currently can be used, and is not limited to a specific one. However, one appropriate between the power generation equipment and the management servers should be selected while considering compatibility, secrecy, and speed of communications.

Further, the present technology may include a means in which power that a contractor shifted the consuming time in the equipment and power generated are classified appropriately and the power amount is accumulated, a means for accumulating the used amount of power which is consumed by a contractor who desired to obtain a value (not having equipment) in the business operation, and a means for comparing and offsetting the power amount and the used amount.

First Embodiment

Hereinafter, the present invention will be explained in detail based on an embodiment. Note that the present invention is not limited to this embodiment.

(Configuration of Power Storage Equipment Management System)

FIG. 1 shows a block diagram of an overall configuration of a power storage equipment management system according to the present technology.

The power storage equipment management system of the present technology mainly has a power storage system 100 and a management server 400, and includes, as required: a network terminal 204, held by an electric power company 200, for linking with the power storage management system of an example embodiment; a network terminal 501, held by a value obtainment applicant 500, for linking with the power storage management system an example embodiment; and a network terminal 600, held by the owner or a manager of the power storage system 100, for linking with the power storage management system of the example embodiment and for viewing power information of oneself and consideration information disclosed. A plurality of power storage systems 100, a plurality of network terminals of the value obtainment applicants 500, the management server 400, the network terminal 204 of the electric power company and the network terminal 600 are connected via a network 300 such as the Internet, respectively. A communication interface 124 and the network terminals 204 and 501 have a function of performing data communications by TCP/IP to the Internet. The management server 400 and the network terminals 204 and 501 may be personal computers or workstations (including mobile telephones and personal digital assistants (PDA) depending on circumstances). The information processing function thereof is realized based on a processing program and a control program of the present technology incorporated in a ROM and the like and by the operation of the computer using a typical OS and software.

The power storage system 100 corresponds to a power storage system installed for storing power in a private house of the user, a building such as an apartment, a company, an organization or a community. The power storage system 100 includes power storage equipment 110, a power conditioner 120, an open/close unit 140, a user load 150 and a watthour meter 160.

The power storage equipment 110 may be a secondary battery or a capacitor described above. The power conditioner 120 mainly includes: a DC/AC inverter 122 for converting DC current taken out from the power storage equipment 110 to AC current; a data storage 126 for processing and storing information about charged and discharged power; a communication interface 124 which is connected to the network 300 and performs data communications; an input unit 127 through which a user inputs data; an output unit 128 for displaying data and outputting an operating state of the system; and a controller 125 for controlling the operation of these respective components. The input unit 127 may be a keyboard or a mouse, which is a means through which a user inputs data and performs operation, instruction and command of the power storage system. As for the output unit 128, a display device such as CRT and LCD or a printing device such as a printer is used. The communication interface 124 is a part performing connection control with respect to the network 300 and transmission and reception of data. The power conditioner 120 manages power storage information and charge information indicating the power storage state of the power storage equipment 110 and discharge information to the load, and generates power information. In other words, the controller 125 controls a current direction of the DC/AC inverter 122, and obtains information about the power and the time, and stores charge time and discharge time of the power storage equipment 110 and the power amount as charge and discharge information on the data storage 126. Further, the time when the power of the power storage equipment 110 is supplied to the user load 150 and the power amount are stored as consumed power information. The stored information is transmitted to the management server 400 by the communication interface 124 over the network 300 as power information of the power storage system.

The open/close unit 140 is connected to the DC/AC inverter 122, the watthour meter 160 and the user load 150, and operates to switch so as to supply either power taken out from the power storage equipment 110 or commercial power supplied from an electric power company to the user load 150. It is preferable that the open/close unit 140 be set such that if power is stored sufficiently in the power storage equipment 110, power is supplied from the power storage equipment, and in a time zone where the power price is low such as midnight, power is supplied from the electric power company. Further, the open/close unit 140 has a power detection sensor 142 for detecting power consumption and the time of the user load 150. The power detection sensor 142 can detect each of the power supplied from the power storage equipment 110 and the power supplied via a distribution network 202 of the electric power company, separately. The user load 150 may be, in a house, a refrigerator, a microwave oven, a cooker, a washing machine, an air conditioner, a television, audio-visual equipment, a personal computer, or a game console, in an office such as a company or an organization, a business machine such as a personal computer, a copy machine, a facsimile or a printer, or an air-conditioner, in a store, a lighting fixture, an exhibit, or a facility such as a vending machine, or a neighboring facility or an incidental facility provided in a community such as a traffic signal and a street lamp.

The watthour meter 160 includes two meters, that is, a purchased power watthour meter 162 of the power purchase side, and a sold power watthour meter 164 of the power selling side. The purchased power watthour meter 162 measures power purchased via the distribution network 202 of an electric power company (called purchased power), and the sold power watthour meter 164 measures power sold via the distribution network 202 of the electric power company (called sold power). The watthour meters 162 and 164 preferably measure the power amount and the time. Further, the watthour meters 162 and 164 have a function of communicating with an electric appliance or an electronic apparatus and electric apparatus provided as the user load 150, and when a function of managing the amount of power consumption for each user load 150 is added, power consumption for each user load 150 and for each time can be measured. Thereby, a value can be set relating to a consumption pattern.

An electric power company has the network terminal 204 in addition to the distribution network 202 for supplying so-called commercial power to users, and performs data communications with the power storage system 100 and the management server 400 of the example embodiment. The terminal 204 is capable of receiving the power information stored on the management server 400 and providing a control instruction to the power storage system 100. For example, an instruction is given to forcibly discharge to the power storage equipment 110 of the user at a time when the electric power company requires to lower the peak of the power generation amount. Alternatively, in order to level the operation of the power generation equipment and to improve the efficiency, instructions of activation, shutdown and the like are transmitted so as to store power in the midnight. Such a forcible function may be included in the contents of the contract with the owner of the power storage system, which may be refused, or advantageous conditions may be provided.

The management server 400 is provided to, for example, a company collecting power values generated by the power storage equipment installed by a user, and mediating the provider of the values and the obtainment applicant of the values. The management server 400 is for managing information about the power storage system 100 and the contractor, and providing the information. As shown in FIG. 1, the management server 400 mainly includes a contractor information database 402, a value obtainment applicant database 404, a data processor/storage 406, an information disclosure unit 408, and an information management unit 401, including the respective parts, for obtaining, processing and providing the stored information.

The contractor information database 402 stores information (name, address, apparatus identification No., power information, interest and tastes of the person) about a contractor installing the power storage system 100. The contractor information is stored on the database 402 beforehand by using an input device (not shown) or by downloading from the power storage system 100 by communications, before the contractor uses this management system.

The value obtainment applicant database 404 stores information (name, address, desired item, desired power amount, desired power unit, consideration or goods which can be provided in return for power obtained) about a person who desires to obtain values of power generated by the power storage system 100 (value obtainment applicant). As same as the contractor information, the value obtainment applicant information stored on the database 404 is also stored before starting the use of the system.

The data processor/storage 406 stores data relating to values of power. The information disclosure unit 408 stores disclosure information viewable by the contractor. The information management unit 401 transmits/receives various pieces of information to/from the power storage system 100, performs classification, evaluation, determination and the like of the values of power by using the power information obtained, and performs processing such as generation and storage of consideration information and generation and storage of disclosure information.

Further, the information management unit 401 including the contract information database 402, the value obtainment applicant database 404, the data processor/storage 406 and the information disclosure unit 408 may be provided in each power storage system 100, not in the management server 400. In such a case, a consideration of power can be determined within the power storage system in a self-absorbed manner. Thereby, in the management server 400 connected over the network, the consideration determined can be referred to.

The value obtainment applicant 500 has a network terminal 501 connected with the management server 400 over the network 300 and a power consumption meter 502. Here, the network terminal 501 is used to give desiring information of oneself to the management server 400 and to obtain disclosure information from the management server 400. Further, the power consumption meter 502 is for measuring the power amount that the value obtainment applicant actually used. For example, the power consumption meter 502 is used to offset the power of the value provider and the power of the value obtainment applicant on the present system.

The network terminal 600 is a terminal through which the contractor is capable of accessing the management server 400 over the network 300. With the network terminal 600, the contractor can check self power information, and refer to consideration information, advertisement information and the like provided by the value obtainment applicant.

Figure 2:
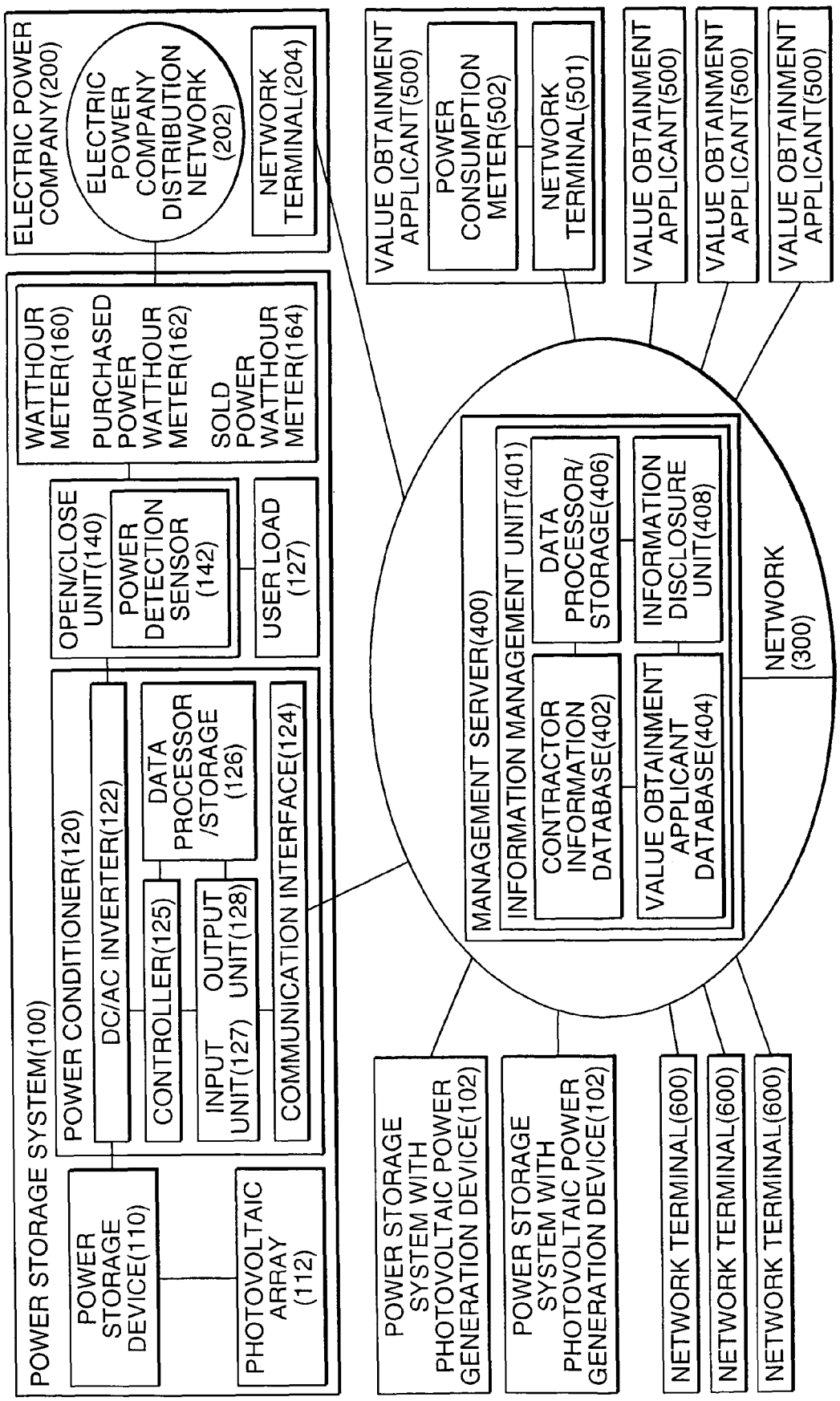
FIG. 2 is a block diagram showing an overall configuration of an example embodiment of a power storage management system with a photovoltaic power generation device.

FIG. 2 shows an embodiment of a power storage system 102 provided together with photovoltaic power generation equipment in which the power storage system has a photovoltaic array 112 as photovoltaic power generation equipment and the power storage equipment 110 is charged with power from the photovoltaic array 112. A controller 125a detects an output of the photovoltaic array 112, and controls whether the power storage equipment 110 is charged with the output of the photovoltaic array 112 or charged by receiving commercial power from the distribution network 202 of the electric power company. When an output from the photovoltaic array 112 is obtained, the controller 125a checks the charged amount of the power storage equipment 110 and the operating state of the user load 150, and controls so as to charge the power storage equipment 110 if the power storage equipment 110 is not fully charged, and to sell the power by the reverse flow to the distribution network 202 of the electric power company if the power storage equipment 110 is full charged. When the power storage equipment 110 is not fully charged and no output is obtained from the photovoltaic array, the power storage equipment 110 is charged by receiving commercial power from the electric power company. Other parts are same as those in FIG. 1, so the same reference numerals are shown.

(Information Processing in Power Storage System)

First, explanation will be given for obtainment generation processing of power information of the power storage system 100. Since operations of the power storage systems in FIGS. 1 and 2 are almost same, they will be explained together below.

Figure 3:
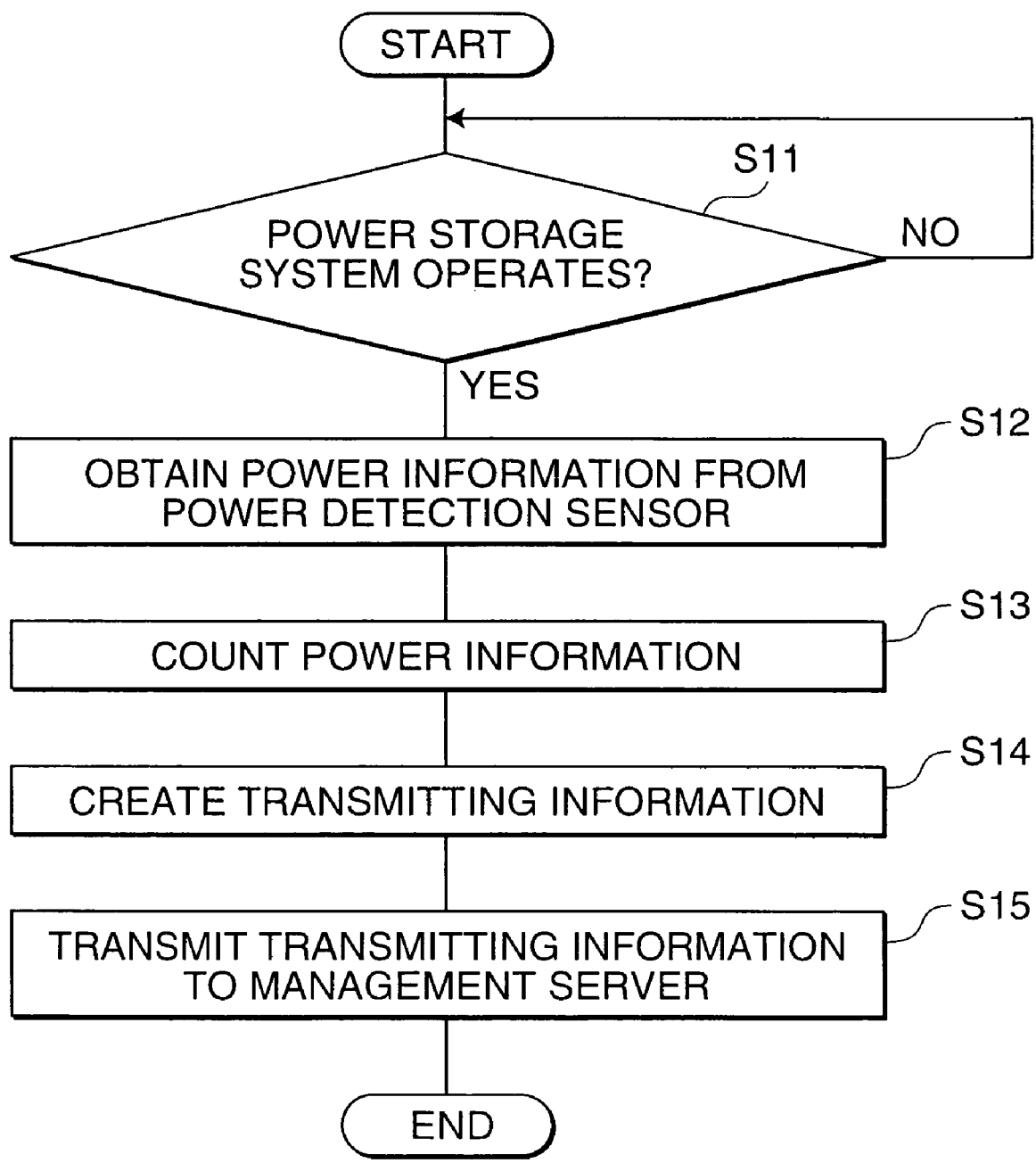
FIG. 3 is a flowchart showing obtainment generation processing of power information of power storage equipment of an example embodiment.

FIG. 3 shows a flowchart of the power storage system 100 according to an example embodiment.

When power reception of the power storage equipment 110 (charging of the power storage equipment) or power consumption from the power storage equipment to the user load (discharging of the power storage equipment) occurs, current flows to the DC/AC inverter 122 capable of converting bidirectionally. Therefore, the controller 125 controls the current, and depending on the operating state of the DC/AC inverter 122, checks activation and shutdown of the power storage system and charging and discharging. In step S11 in FIG. 3, based on the operating state of the DC/AC inverter 122, the activated state or the shutdown state of the power storage system is confirmed. By checking the activated state or the shutdown state of the power storage system, if it is activated, information about the power is obtained from the power detection sensor 142 (step S12). From the power detection sensor 142, charging information or discharging information of the power storage equipment, or consumption information by the user load 150 is obtained.

Next, in step S13, the power conditioner 102 obtains the charging information, the discharging information or the consumption information, and stores it on the data storage 126. Here, assuming that power information is collected and transmitted to the management server 400 every day, for example, in the power storage system 100, the stored power amount and the power amount supplied to the load are added and subtracted, respectively, whereby the power amount for a day is collected. Note that a transmission unit is not limited to one day. It may be a unit of one week or one month. Addition and subtraction of the power amount may not only be performed by adding and subtracting simply, but also be performed by the time, by the type of load, or by the type of charged power. If there classifications are weighted respectively and collected, addition and subtraction become easier.

In step S14, the controller 125 creates transmission information by using the charging information, discharging information and consumption information collected. The transmission information includes identification information of the contractor having the power storage system 100, the stored power amount, the discharged power amount, the time of storage, the time of discharging, the consumption pattern, and the like. In step S15, the communication interface 124 transmits the created transmission information to the management server 400 over the network 300. This transmission information corresponds to the power information described above.

(Information Processing in Management Server)

Next, information processing in the management server 400 will be explained.

Figure 4:
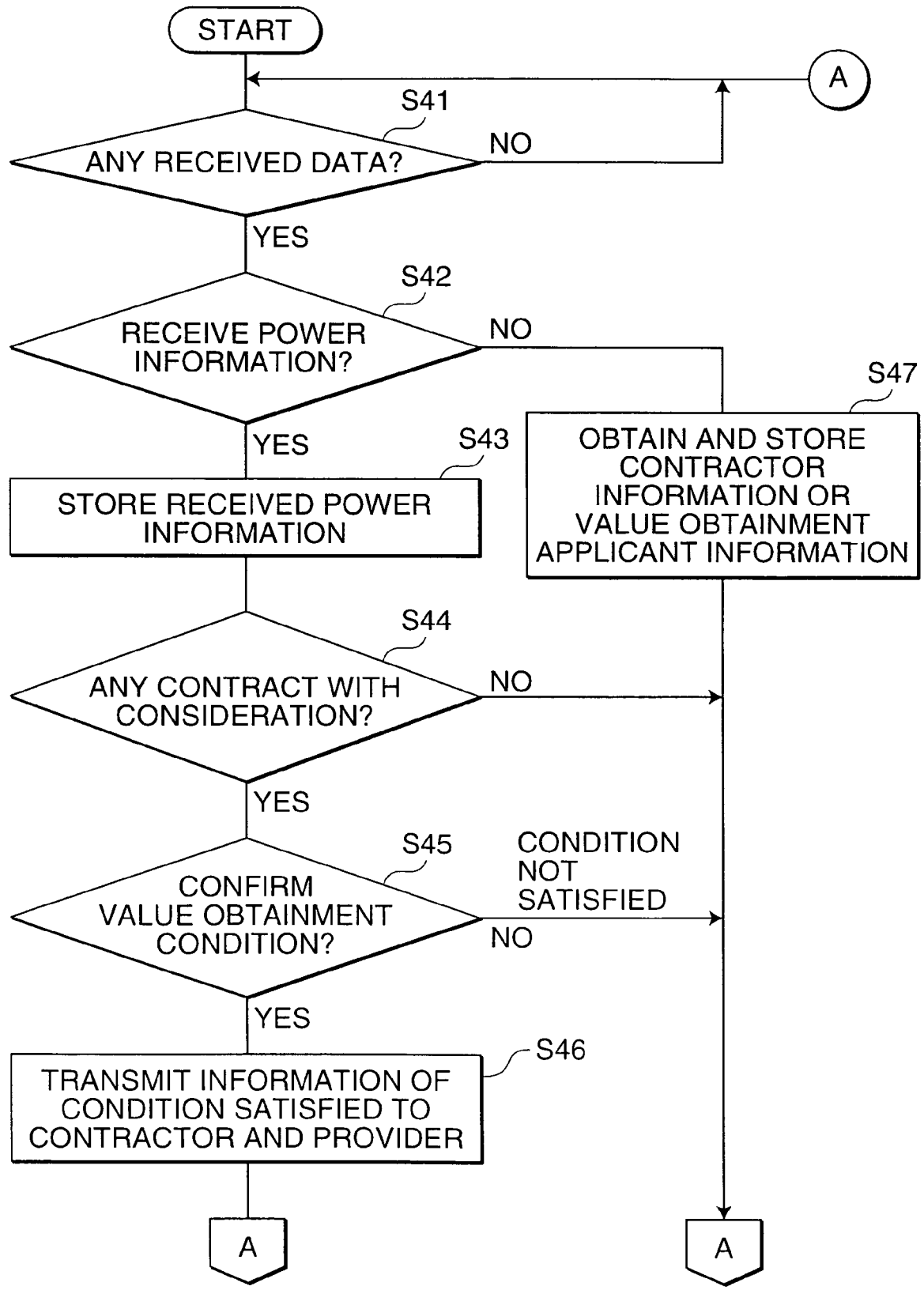
FIG. 4 is a flowchart showing information processing in an example embodiment of a management server.

FIG. 4 shows a flowchart of information processing by the management server 400 of an example embodiment.

This information processing is performed by the information management unit 401.

First, in step S41, it is checked whether there is received data. If data is received from the communication interface 124 of the power storage system 100 or from the network terminal 501 of the value obtainment applicant 500, the processing proceeds to step S42. In step S42, the information management unit 401 checks the contents of the data received, and determines whether it is power information from the power storage system. If it is the power information, the processing proceeds to step S43. In step S43, the information management unit 401 data-analyzes the power information received, and saves it on a predetermined storage or a database. That is, identification information of the contractor included in the power information is confirmed, and the power information received is stored on a storage area relating to the contractor within the contractor information database 402.

On the other hand, if the information management unit 401 analyzes that the data received is not power information but consideration information from the value obtainment applicant 500, in step S47, the received data is obtained as value obtainment applicant information and saved on the value obtainment applicant database 404. Further, if it includes information specifying a value obtainment applicant, consideration information provided by a value obtainment applicant, advertisement information and the like, the received information is saved on a storage area of the information of the value obtainment applicant inside the value obtainment applicant information database 404, corresponding to the information. Alternatively, if the received data is contractor information from the owner of the power storage system, the received information is saved on a storage area of information of the contractor within the value obtainment applicant database 402. After obtaining and saving the information in step S47, the processing is back to step S41 so as to be in a state of waiting data reception.

After the power information is saved in step S43, the processing proceeds to step S44 in which it is checked whether the contractor providing the power information has made a consideration contract. If a consideration contract has been made, the processing proceeds to step S45, and if it has not been made, the processing is back to step S41. Here, a consideration contract refers to a contract for obtaining values corresponding to the power amount made between a contractor A and a company B who is a power value obtainment applicant.

Information of the consideration contract is stored beforehand on the contractor information database 402 by the processing in step S47. For example, in step S44, if there is information that the contractor A of the power amount data received is made a contract with the company B in the contractor information database 402, the processing proceeds to step S45.

In step S45, the contents of the consideration contract is checked, and it is confirmed whether the current state of the contractor satisfies the value obtainment conditions. Here, by using the two databases 402 and 404 and the consideration information stored on the data processor/storage 406, the power information received is processed and determined whether the contents (conditions) of the consideration contract are satisfied.

If the consideration contract conditions are satisfied, it is considered that the value obtainment conditions are completed, so the processing proceeds to step S46. Then, based on the contents of the consideration contract, condition completion information showing the conditions are completed is transmitted to both of the contractor A and the company B who made the consideration contract. If the value obtainment conditions are not completed, the processing is back to step S41.

(Specific Example of Consideration Contract in Step S45)

A specific example of step S45 will be explained.

It is assumed that the following information relating to the contractor A is stored on the contractor information database 402.

(A-1) Specifying information of contractor A: name, address, ID No., telephone No.

(A-2) Consideration contract information: contract company name B, company ID No.

(A-3) The current accumulated amount of power in which midnight power is stored and used in the daytime by the power storage equipment: 1400 kWh Further, it is assumed that the following information relating to the contract company B is stored on the value obtainment applicant information database 404.

(B-1) Specifying information of company B: name, address, ID No.

(B-2) desired total amount of power=30000 kWh (B-3) Consideration information:

(1) Subject goods=garden chair (2) Power amount required for exchange: 1500 kWh, first 20 applicants (3) A contractor should offset such power that midnight power is stored and used in the daytime with power used by the company B for manufacturing products, and authorize to indicate the fact on a specified label so as to use it for promotion.

Here, a specified label means, for example, a label shown in FIG. 5. The company B attaches the label on its own product for promoting the own product, and sells it. As a compensation for it, the company B undertakes, to the contractor, to provide goods (e.g., a garden chair) of the company B.

Here, as a specific example, it is assumed that the content of the consideration contract between the contractor A and the company B is "when the accumulated amount of power that midnight power is stored and used in the daytime reaches 1500 kWh in total, one garden chair will be provided for free".

In such a situation, in step S45, the current accumulated amount of power, in which the midnight power is stored and used in the daytime, of the contractor A is compared with the amount (1500 kWh) which is the value obtainment condition of the content of the consideration contract of the company B.

In the condition setting (A-3) described above, the current accumulated amount of power in which midnight power is stored and used in the daytime of the contractor (1400 kWh) does not reach the total power amount, so the processing is back to step S41.

On the other hand, assuming that the accumulated amount of power in which midnight power is stored and used in the daytime of the contractor A reaches 1500 kWh, it reaches the value obtainment condition (1500 kWh) which has been set. Therefore, it is determined that the condition of the consideration contract is completed in the comparison processing in step S35.

In this case, the processing proceeds to step S46, and the fact that the condition is completed is notified to both of the contractor A and the company B. Thereafter, the company B who confirmed the notification of the completion of the condition delivers a promised garden chair to the contractor A.

Note that although, in the label shown in FIG. 5, the amount of power for obtaining the value is expressed based on the performance of the previous fiscal year (a part corresponding to 5%), an expression on the basis of the amount of power determined based on the amount of power measured by the power consumption meter 502 shown in FIG. 1 is preferable since an indication having less time lag is possible.

By performing a set of processing as described above, various benefits can be given to those relating to the power storage management system. For example, a user installing the power storage system 100 (corresponding to the contractor A) can get a consideration (garden chair) by the present system, although the user conventionally only argued the economical efficiency from the price difference between the daytime and the night time in the power price menu even though the user contributed to an improvement in the environment by storing midnight power and use it in the daytime.

Further, those who supplying the power storage system can gain economical benefit if more users introduce power storage equipment since they can get considerations. Moreover, not only those who provide power storage system but also general companies (corresponding to contract companies B) can promote their efforts for environmental improvements and the like by placing influential advertisements (corresponding to attachment of a label) to potential users of their own products, in exchange for providing considerations to the contractors.

Although, in the explanation above, determination of value is performed in the management server, the present technology is not limited to this configuration. Determination of value may be performed in a system on the power generation equipment side or in a personal terminal for viewing power information with reference to the data in the management server.

In other words, a time shift of power by a power storage system generates a new value, and the owner of the power storage system can obtain a consideration since the value gains recognition. A company who purchases (obtains) the value can gain a benefit to place an advertisement efficiently and easily to potential purchasers of its products in exchange for providing a consideration to the owner of the power storage equipment.

In the specific example described above, there is shown an example in which a consideration is obtained by offsetting power consumed by oneself and power that the company B used for manufacturing a product among power generated by itself under the condition that the company uses the amount of power generated by itself which is consumed by itself for making an appeal for environmental contribution. However, subjects of value may be various values.

Values obtained by storing midnight power and using it in the daytime include following ones:

(1) A value with respect to the level contributing to a reduction in carbon dioxide ($CO_2$) discharge or the like obtained from the difference in carbon dioxide emission rate between the daytime power and the midnight power, and (2) A value with respect to a contribution to a reduction in the power generation cost (operating cost, installment cost) of commercial power caused by selling power to an electric power company so as to contribute to the load leveling.

Such values are numerical value data and stored beforehand on the data processor/storage 406.

The values described above can be calculated if data relating to the amount of power in which midnight power is stored and used in the daytime and the time is available. For example, it is possible to adopt a point system by setting 1 kWh as one point for example, and to provide monetary value to the point. Further, as for information of time zones, not only time but also seasonal factors may be added. For example, points may be classified in detail such that for a case where midnight power is time-shifted to the daytime in the summer (within a certain time rage of a certain period), 1 kWh is 2 points. In the case of adopting a point system as described above, conversion between the amount of power and points may be performed uniformly, or may be set arbitrarily by a value obtainment applicant based on the benefit of the value obtainment applicant.

The company B (value obtainment applicant) may appropriately set products, moneys, cash vouchers or the like which should be provided to contractors as considerations depending on the number of points, for example.

Further, in a case where such a value evaluation criteria (1) is used, in step S45, the power information is referred to and processing of converting (processing) the subject amount of power into data is performed so as to calculate the points in order to confirm the conditions, instead of using the amount of power consumption, and the points are compared with the value obtainment condition set beforehand.

In this way, the numerical value data stored on the data processor/storage 406 is used for converting the amount of power consumption into value data as described above.

Further, the data processor/storage 406 may store information about elements for determining values and the importance of the elements. Although, in the above description, an example of power generation and consumption time has been shown, types of power generation equipment and consumption patterns may be used as other "elements".

"The importance of element" is weighting of evaluation, which means that a high importance is given to power generated in the daytime in midsummer, and a low importance is given to power generated in a time zone of low demand.

By using such elements and importance information, it is possible to set the value of power consumption while taking into account not only the amount of power consumption received, but also factors such as quality and consuming time zone of the power consumption and the scale of equipment.

Second Embodiment

Next, explanation will be given for a specific example of an embodiment in which a contractor selects any one of considerations when there are a plurality of considerations. Here, explanation will be given with reference to the example of the power storage system provided together with photovoltaic power generation device shown in FIG. 2. Basic configuration, operation and flowchart are same as those of the first embodiment. In the present system, generated power information which is generated by using the photovoltaic power generation device is added. As for the generated power information, it is considered that a high value may be set when power is generated by using a solar cells in the daytime in midsummer and is provided by reverse flow to the user load or to the system. In a case where the power generation equipment and the power storage system are installed together as described above, it is possible to handle by converting to points which have been set beforehand in order to quantify the respective values easily. As a specific example thereof, explanation will be given below for a case where power points are set and the values are distributed.

(Criteria of Power Points)

A case where 1 kWh=2 points are given:

When power generated by photovoltaic power generation is time-shifted and consumed in a time period from 12 o'clock to 16 o'clock.

A case where 1 kWh=1 point is given:

When power generated by photovoltaic power generation is consumed in a time period other than that described above.

Midnight power is stored by using a power storage system and the power is consumed in a time period from 12 o'clock to 16 o'clock.

It is assumed that the following information is stored beforehand on the information storage of the management server 400.

Information stored on the value obtainment applicant information database 404

(1) Provider: a company B manufacturing and selling garden goods.

Conditions: to post supporting state on a website of environmental contribution.

Consideration: to provide a garden chair for free.

Required power points: 1000 points.

Obtainment desiring power amount: 30000 kWh (first 30 applicants).

(2) Provider: a company C selling organic vegetables by home delivery service.

Conditions: to post supporting state on a website of environmental contribution.

Consideration: to deliver a set of organic vegetables for free.

Required power points: 1500 points.

Obtainment desiring power amount: 30000 kWh (first 20 applicants).

(3) Provider: a company D providing airline services.

Conditions: to post supporting state on a website of environmental contribution.

Consideration: a domestic air ticket (return tickets) selected from the predetermined dates.

Required power points: 3000 points.

Obtainment desiring power amount: 30000 kWh (first 30 applicants).

Disclosure information stored on the disclosure information storage 408

(4) The consideration (garden chair) of the company B and required power points.

(5) The consideration (a set of organic vegetables) of the company C and required power points.

(6) The consideration (domestic air ticket selected from the predetermined dates) of the company D and required power points.

(7) Accumulated power points of the contractor A currently exchangeable.

Here, it is assumed that the disclosure information stored on the disclosure information storage 408 is in a state where at least contractors or value obtainment applicants can view it by accessing the management server 400.

Figure 6:
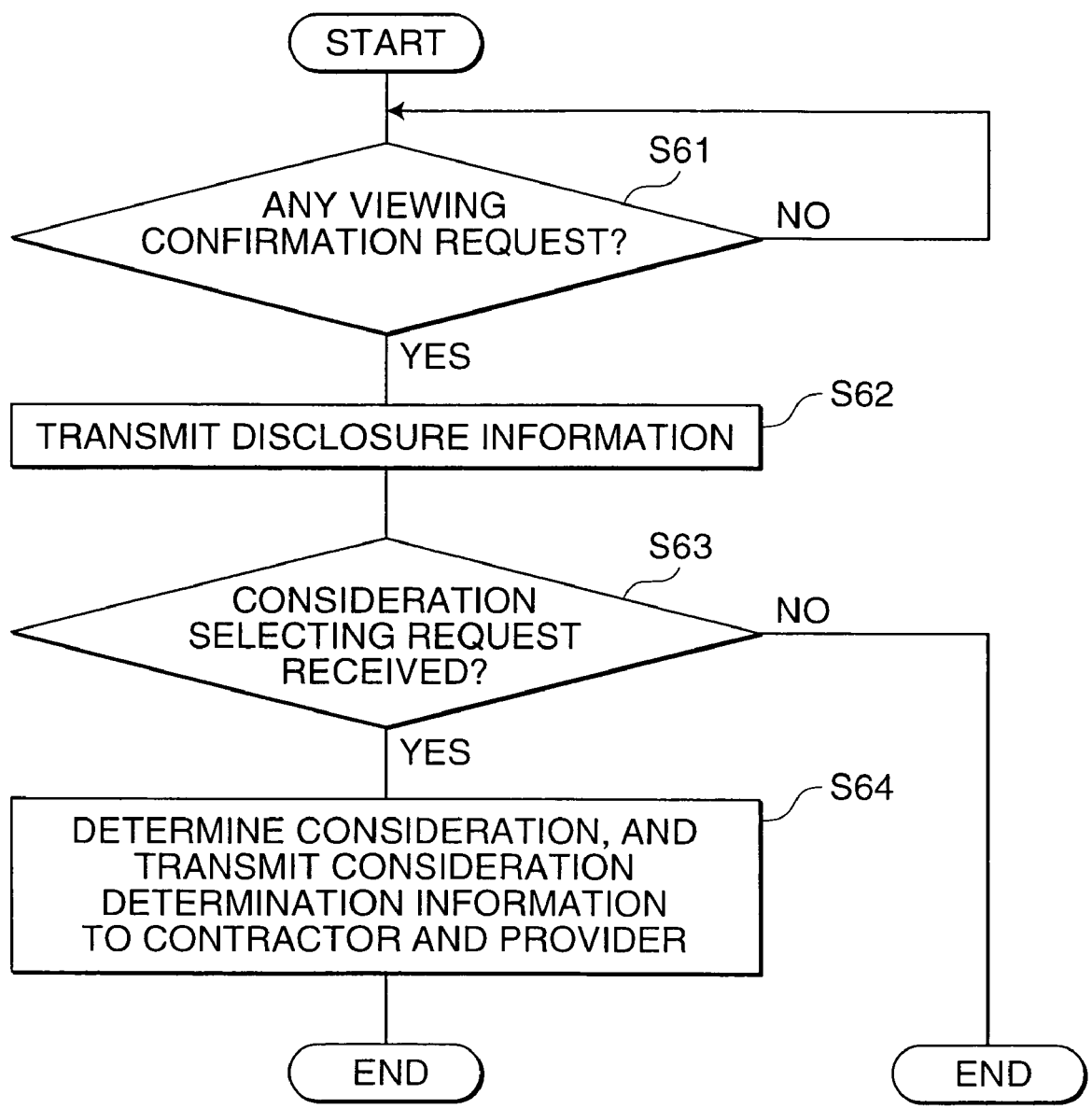
FIG. 6 is a flowchart showing selection processing of a contribution of an example embodiment.

FIG. 6 shows a flowchart of selection processing of a consideration in an example embodiment.

In the above-mentioned state, a contractor A connects to the management server 400 from the terminal for example, and performs a view confirmation request operation of disclosure information. When the management server 400 receives the view confirmation request (step S61), the management server 400 transmits disclosure information of the contractor A to the contractor A (step S62). On the terminal or the like of the contractor A, the disclosure information is displayed. With the disclosure information, the contractor A can confirm current exchangeable power points of oneself. Here, it is assumed that the power amount points, exchangeable for a consideration, stored in the disclosure information unit 408 are 3100 points.

Then, the contractor A, who confirmed that the power amount points exchangeable for a current consideration are 3100 points, searches or confirms whether there is a consideration exchangeable with the power consumption amount. Assuming that three considerations which can be obtained with the power consumption amount of the contractor A are included in the disclosure information transmitted as (4) to (6) above, the contractor A confirms that there are pieces of consideration information provided by the three companies (B, C, D).

If there is a consideration that the contractor A desires in the three pieces of consideration information, the contractor A selects the consideration. For example, the contractor A operates to select a desired domestic air ticket among domestic air tickets of predetermined dates provided by the company D. With this operation, the selected information (consideration selection request) is transmitted to the management server 400. When the information management unit 401 of the management server 400 receives the request (step S63), it determines that an exchange of the power consumption amount and the consideration is completed between the contractor A and the company D, whereby it transmits consideration determination information, indicating that a consideration exchange contract is made, to the contractor A and the company D (step S64).

Then, the company D, who confirmed that the consideration exchange contract was made with the contractor A, sends the domestic air ticket selected among the predetermined dates to the contractor A.

As described above, if there are a plurality of exchangeable considerations with respect to the power consumption amount of the contractor A, all pieces of consideration information are disclosed to the contractor A. Therefore, the contractor A can select a desired consideration.

Although, in the example embodiment described above, photovoltaic power generation is used as power generation equipment, the present technology is of course applicable to systems using power generation equipment utilizing wind power generation, a fuel cell, micro water power generation, and a gas engine, as other types of power generation placing small environmental load.

Further, it is also possible to set points in detail, depending on combinations of the types of power generation equipment and power generation times. For example, in power generation utilizing wind power generation, a fuel cell, micro water power generation and a gas engine, there is no limitation in time of power generation, but a difference may be made between power generated in the daytime and power generated in the night time, or a difference may be made depending on whether power and heat are provided together including hot water or the like, for example.

Even for power storage equipment, ranking may be performed depending on the power efficiency in power storage and power discharge of the power storage equipment, on environmental load at the time of waste processing and the like, and based on the rank, points may be treated differently.

In this way, by identifying the definition of conversion to points and using a common unit as a point, the management system of the present technology can be operated easily even when various systems are mixed.

Third Embodiment (Mutual Services with Services of Different Industries)

Systems for acquiring goods or converting to money by mileage services and point systems intended for attracting users are widely spread among credit card companies, airline companies and various stores. A specific example of a mutual service with such a service will be explained.

In this case, based on each value information, power amount obtained from power information must be converted into points or the like so as to be treated in a common unit. Hereinafter, a mutual service with a credit card company will be explained.

Point Criteria 1 kWh=2 points

When power is generated by photovoltaic power generation and consumed in a time period from 12 o'clock to 16 o'clock (including time shift by storage battery).

When power is generated by a fuel cell having a cogeneration system and consumed in a time period from 12 o'clock to 16 o'clock (including time shift by storage battery).

1 kWh=1 point

When power generated by photovoltaic power generation is consumed in a time period other than that described above.

When power generated by a fuel cell is consumed in a time period other than that described above.

When midnight power is stored by using a power storage system and the power is consumed in a time period from 12 o'clock to 16 o'clock.

Transaction amount of J company credit card: 2 points for 10000 Japanese yen

When a contractor Z, having a power storage system provided together with photovoltaic power generation system of 3 kWh, uses a J company's credit card to pay for living cost and communication cost for a year, and the total payment is one million Japanese yen, information about the contractor Z is as follows:

(Z-1) Specifying information of contractor Z: name, address, ID No., telephone No.

(Z-2) Consideration contract information: not determined (Z-3) Current exchangeable points Equipment 1: 2000 points Exchangeable points obtained by using credit card: 200 points (transaction amount: one million Japanese yen)

In a case other than using the above-mentioned contractor information, it is possible to perform an exchange for a consideration by using the same manner as the first and second embodiments. If the contractor Z uses the exchangeable points, the contractor Z can perform an exchange for a consideration corresponding to 2200 points.

Further, with emergence of new electricity companies, there may be differences in considerations set among a plurality of companies even for power of the same season or the same time zone.

In such a case, it is preferable not to fix power values beforehand but to enable information stored on the data processor/storage 406 and the like to be updated from time to time in order to flexibly respond to fluctuations and differences of power values.

In this way, by causing power values to fluctuate corresponding to various situations, it is possible to enhance consciousness of contractors to energy saving and energy creation, to make the benefits of the contractors and companies more precisely, and to promote introduction of power storage equipment.

Further, from the viewpoint of diffusion of power storage equipment and power generation equipment, power generation equipment itself must be installed by a large number of users. Currently, however, a large amount of moneys are still required to introduce the equipment. Therefore, by forming a management system in which money is invested by third parties for introducing equipment and considerations are given to the investment although equipment is not introduced by oneself, or forming a management system in which the number of participation in events relating to energy saving or the number of using buildings in which power storage equipment and power generation equipment and the used amount are converted into points determined by the power amount, it is possible to promote diffusion of power storage equipment and power generation equipment, although indirectly.

Fourth Embodiment

In Case of Office

Demand for power in offices is growing continuously. In order to reduce discharge amount of $CO_2$ from now, it is effective to make power consumption of offices efficient. An example in which a system of the present technology is used in an office machine in an office will be explained by using a case of a copy machine.

In this case, storage battery equipment installed for each copy machine, or total power storage equipment provided in a plurality of copy machines having power storage equipment is considered as one power storage equipment, which corresponds to power storage equipment, described above, held by a user.

Copy machine: Complex Copy Machine AR-L501, manufactured by Sharp (average power consumption: 173 Wh)

Number of contracted copy machines with power storage equipment: 50

It is set that midnight power corresponding to three hours, in terms of average power consumption, is stored in power storage equipment provided to the copy machines, and the power is supplied from the power storage equipment in a time period from 12 o'clock in the noon to 15 o'clock in the afternoon. With this system, a power shift of 25.95 kW/day is possible, and assuming the number of business days of the company is 240 days, a power shift of 6,228 kW/year is possible.

Treating this as same as the case example of the second embodiment, 6,228 points can be obtained in a year. Although they can be treated as the same systems, usually a power price menu is set to a company in which power price is different depending on the load factor. Therefore, it is practical to use such a power plan.

Recently, many copy machines are complex machines (having facsimile function), which have already been connected to a telephone line, so only a few pieces of equipment are required to be added, besides power storage equipment. Therefore, they are preferable for being used in carrying out the present technology. In this case, copy machines with power storage equipment may be owned by the user. Alternatively, they may be used with a lease contract so as to be charged depending on the amount of use like a business model in the current copy machine, or a lease company may enjoy benefits by a contract with an electricity company.

Fifth Embodiment

In Case of Traffic Signal

LED-type signals, enabling to reduce power consumption of signals, are getting wide-spread. Power consumption in LED-type signals is significantly smaller than conventional signals, so they can be operated by relatively small power storage equipment not interfering installment.

Here, explanation will be giving for a case in which the present system is applied to a signal.

Signal power consumption (per intersection): 300 W

Number of signals with power storage equipment: 1,000 sets

It is set that midnight power corresponding to three hours, in terms of average power consumption, is stored in power storage equipment provided to the signal systems, and the power is supplied from the power storage equipment in a time period from 12 o'clock in the noon to 15 o'clock in the afternoon.

With these systems, a power shift of 900 kWh/day is possible as a whole, and since the signals are operated 365 days, a power shift of 328,500 kWh/year is possible.

Signals are public facilities, so this embodiment is different from the former ones. However, with a contract with an electric power company, it is possible to save electricity expense required for the signals by promoting use of midnight power, or to gain public benefit by reducing discharge amount of $CO_2$ (setting a difference in $CO_2$ discharge amount between midnight power and daytime power and including it in the reduction target of the country). Further, by installing a power source together, it is possible to light signals with power from the power storage equipment at the time of emergency, serving as equipment which is very useful in responding to disasters.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A power storage equipment management system comprising
   a power generation equipment,
   a power storage equipment, and
   a management server for managing power information of the power storage equipment, wherein
   the power storage equipment includes
   a power receiving unit for charging the power storage equipment with power from the power generation equipment or power from a power system,
   a power supplying unit for supplying power charged by the power storage equipment to a load,
   an information controller for generating power information about charging and discharging of the power receiving unit or the power supplying unit, and
   a communication unit for transmitting to the management server the power information and power receiving time information when the power receiving unit receives power, power consumption time information when the load consumes power, power consumption type information which is set for a type of power consumption by the load, or power generation equipment information including a kind or a location of the power generation equipment, or a distance from the load to the power generation equipment,
   the management server includes
   a consideration storage unit for storing consideration information which has been set beforehand about environmental improvement obtained by a time shift between the charging time of the power storage equipment and the power consumption time of the load, about environmental improvement by the type of power consumption of the load, or about the environmental improvement of the power generation equipment,
   a consideration receiving unit for receiving the power information, and the power receiving time information, the power consumption time information, the power consumption type information or the power generation equipment information transmitted from the power storage equipment, and
   an information management unit for determining a consideration based on the power information, and the power receiving time information, the power consumption time information, the power consumption type information or the power generation equipment information transmitted from the power storage equipment.

2. The power storage equipment management system according to claim 1, wherein
   the power generation equipment is a power generation equipment utilizing natural energy or a fuel cell, or a power generation equipment using a gas engine generator.

3. The power storage equipment management system according to claim 1, wherein the power receiving unit receives an information of either a type of power or a receiving time.

4. The power storage equipment management system according to claim 1, wherein the power supplying unit receives an information of either a time at which power is supplied from the power storage equipment to the load or a type of consumption.

5. A power storage equipment management system according to claim 1, wherein
   the management server includes
   a contractor information storage for storing an information of power price, or type of power receiving time,
   a value obtainment applicant information storage for storing consideration information in which power setting information having been set by a value obtainment applicant and a consideration are associated.

6. The power storage equipment management system according to claim 5, wherein
   the management server includes a disclosure information storage for storing disclosure information including the consideration information, and
   in the case where there are plural pieces of consideration information stored in the value obtainment applicant information storage, the information management unit selects all pieces of consideration information associated with the power information received from the power storage equipment, and makes the disclosure information including all pieces of the consideration information selected to be viewable, and in the case of receiving information that a contractor of the power storage equipment selected a specific piece of consideration information among all pieces of the viewable consideration information selected, the information unit determines a consideration included in the consideration information selected as a consideration of the contractor.

7. The power storage equipment management system according to claim 1, wherein
   the information management unit determines the consideration based on the consideration information and one of information whether the power generation equipment generates power and heat, power efficiency information of charging and discharging by the power storage equipment, and environmental load of wasting the power storage equipment system.

8. A management server of a power storage equipment management system, comprising:
   a communication unit for receiving a power information relating to charging or discharging from a power storage equipment which charges or discharges power, power receiving time information when a power receiving unit of the power storage equipment receives power, power consumption time information when a load being supplied power by the power storage equipment consumes power, power consumption type information which is set for a type of power consumption by the load, or power generation equipment information including a kind or a location of a power generation equipment supplying power to the power receiving unit of the power storage equipment, or a distance from the load to the power generation equipment;

a contractor information storage for storing an information of power price, type of power receiving time, a consideration storage unit for storing consideration information which has been set beforehand about environmental improvement obtained by a time shift between the charging time of the power storage equipment and the power consumption time of the load, about environmental improvement by the type of power consumption of the load, or about the environmental improvement of the power generation equipment, a consideration receiving unit for receiving the power information, and the power receiving time information, the power consumption time information, the power consumption type information or the power generation equipment information transmitted from the power storage equipment, a value obtainment applicant information storage for storing, in advance, consideration information between said power storage equipment and a value obtainment applicant, in which the power information is associated with a consideration, for each value obtainment applicant providing the consideration; and an information management unit for determining a consideration based on the power information, and the power receiving time information, the power consumption time information, the power consumption type information or the power generation equipment information transmitted from the power storage equipment, wherein the communication unit informs the contractor and the value obtainment applicant who has set the consideration of the consideration being determined by the management server.

9. A power storage equipment management method comprising the steps of:
 i) obtaining power for charging a power storage equipment;
 ii) supplying the power charged in the power storage equipment to a load;
 iii) generating a power information relating to charged power or discharged power yielded in the above step i) or in the above step ii);
 iv) transmitting the power information to a management server; and
 v) determining, by the management server, a consideration with respect to the power information transmitted from the power storage equipment by using consideration information which has been set beforehand between said power storage equipment and a value obtainment applicant party, wherein the consideration to be determined by the management server is set corresponding to at least one of environment improvement obtained by a time shift between the charging time of the power storage equipment and the power consumption time of the load, about environmental improvement by the type of power consumption of the load, or about the environmental improvement of the power generation equipment.

10. A computer-readable storage device storing a power storage equipment management program that, when executed by a processor of a host system, causes the processor to execute the steps of:
 i) obtaining power for charging a power storage equipment;
 ii) supplying the power charged in the power storage equipment to a load;
 iii) generating a power information relating to charged power or discharged power yielded in the above step i) or in the above step ii);
 iv) transmitting the power information to a management server; and
 v) determining, by the management server, a consideration with respect to the power information transmitted from the power storage equipment by using consideration information which has been set beforehand between said power storage equipment and a value obtainment applicant party, wherein the consideration to be determined by the information management unit is set corresponding to at least one of environment improvement obtained by a time shift between the charging time of the power storage equipment and the power consumption time of the load, about environmental improvement by the type of power consumption of the load, or about the environmental improvement of the power generation equipment.

* * * * *